USO12187313B2

(12) United States Patent
Mangas et al.

(10) Patent No.: US 12,187,313 B2
(45) Date of Patent: Jan. 7, 2025

(54) METHODS AND SYSTEMS FOR VEHICLE PATH PLANNING

(71) Applicant: ZENUITY AB, Gothenburg (SE)

(72) Inventors: Jeremy Mangas, Shelby Township, MI (US); Takuro Matusda, Farmington Hills, MI (US)

(73) Assignee: Zenuity AB, Gothenburg (SE)

( * ) Notice: Subject to any disclaimer, the term of this patent is extended or adjusted under 35 U.S.C. 154(b) by 291 days.

(21) Appl. No.: 17/910,844

(22) PCT Filed: Mar. 13, 2020

(86) PCT No.: PCT/US2020/022598
§ 371 (c)(1),
(2) Date: Sep. 12, 2022

(87) PCT Pub. No.: WO2021/183137
PCT Pub. Date: Sep. 16, 2021

(65) Prior Publication Data
US 2023/0099853 A1 Mar. 30, 2023

(51) Int. Cl.
B60W 60/00 (2020.01)
B60W 40/02 (2006.01)

(52) U.S. Cl.
CPC ........ *B60W 60/0011* (2020.02); *B60W 40/02* (2013.01); *B60W 60/00274* (2020.02)

(58) Field of Classification Search
CPC ....... B60W 60/0011; B60W 60/00274; B60W 40/02

(Continued)

(56) References Cited

U.S. PATENT DOCUMENTS

2002/0161513 A1 10/2002 Bechtolsheim et al.
2015/0344030 A1 12/2015 Damerow et al.
(Continued)

FOREIGN PATENT DOCUMENTS

EP 2863177 A1 * 4/2015 ............ G01C 21/20
EP 3588226 A1 1/2020

OTHER PUBLICATIONS

S. Gopikrishnan et al. "Localization of Sensor Nodes in the presence of obstruction in Wireless Sensor Network Environment," 2016, Publisher: IEEE.*

(Continued)

*Primary Examiner* — Tuan C To
(74) *Attorney, Agent, or Firm* — Sage Patent Group

(57) ABSTRACT

There is provided a method for operating a vehicle having an automated driving system (ADS) and a fallback stop feature. The method includes obtaining sensor data and localization data including information about a surrounding environment of the vehicle, and determining a plurality of candidate paths for a prediction time horizon within a drivable area in the surrounding environment of the vehicle based on the sensor data and the localization data. Further, the method includes determining an expected trajectory of a target vehicle located in the surrounding environment of the vehicle for the prediction time horizon based on the obtained sensor data and localization data, and determining, for each candidate path, an overlap cost parameter for an overlap between the target vehicle's expected trajectory and a set of stop positions of the vehicle based on predicted executions of the fallback stop feature within the prediction time horizon.

14 Claims, 6 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2017/0336788 A1 | 11/2017 | Iagnemma | |
| 2018/0150081 A1* | 5/2018 | Gross | G01C 21/3446 |
| 2018/0164827 A1 | 6/2018 | Chu et al. | |
| 2020/0064851 A1 | 2/2020 | Wilkinson | |
| 2021/0064042 A1* | 3/2021 | Matsuda | G01C 21/3407 |
| 2021/0139048 A1* | 5/2021 | Russell | G08G 1/166 |
| 2021/0188319 A1* | 6/2021 | Xu | B60W 60/0016 |
| 2021/0200231 A1* | 7/2021 | Zhu | B60W 30/181 |
| 2021/0255622 A1* | 8/2021 | Haynes | B60W 60/0027 |
| 2021/0284108 A1* | 9/2021 | Liu | B60T 7/22 |
| 2021/0394794 A1* | 12/2021 | Gyllenhammar | B60W 40/10 |
| 2022/0402494 A1* | 12/2022 | Krutsch | B60W 40/105 |
| 2023/0331217 A1* | 10/2023 | Wang | B60W 30/18009 |

OTHER PUBLICATIONS

Extended European Search Report mailed Nov. 8, 2023 for European Patent Application No. 20924386.4, 11 pages.
International Search Report and Written Opinion mailed May 28, 2020 for International Application No. PCT/US2020/022598, 13 pages.

* cited by examiner

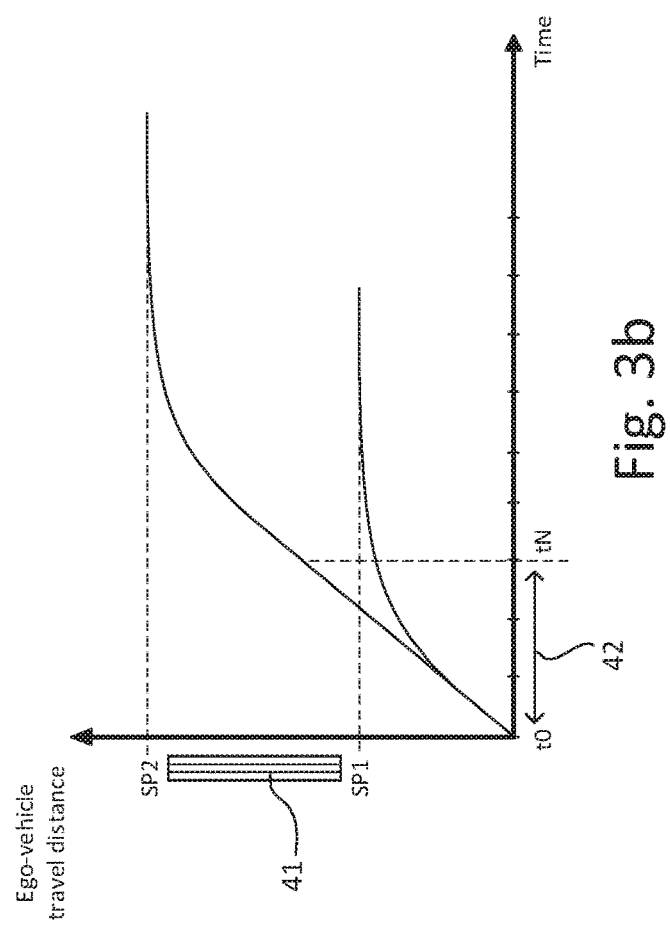
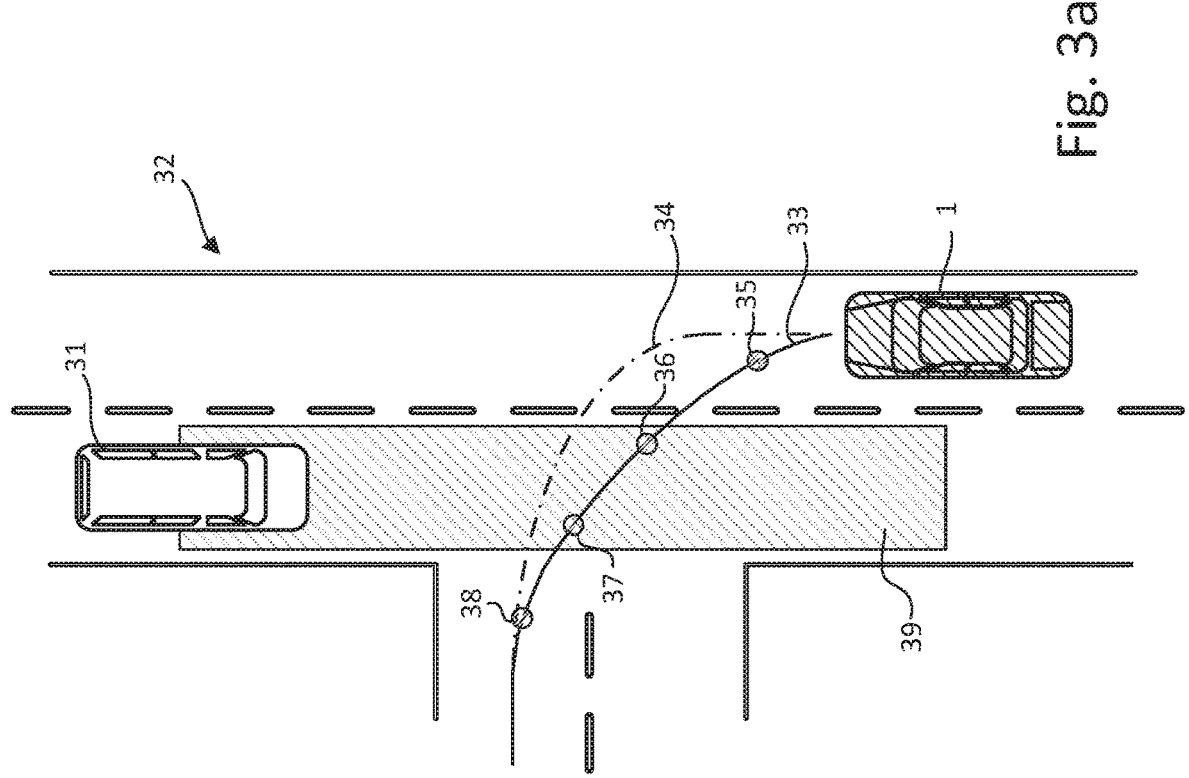
Fig. 3b
Fig. 3a

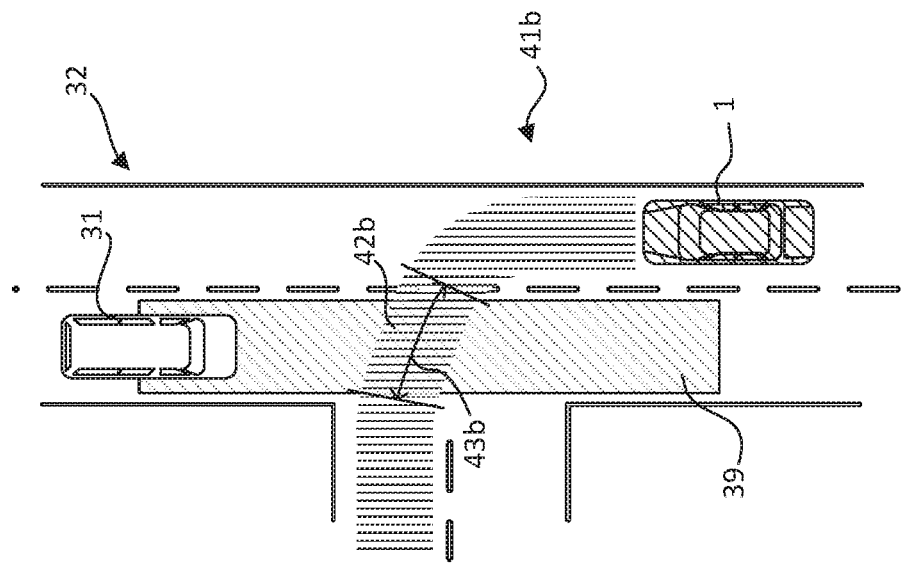
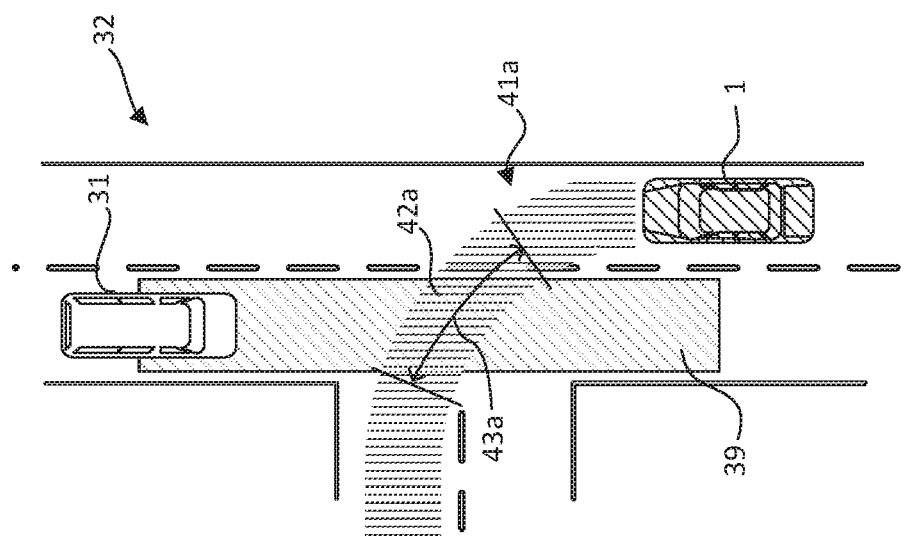
Fig. 4b
Fig. 4a

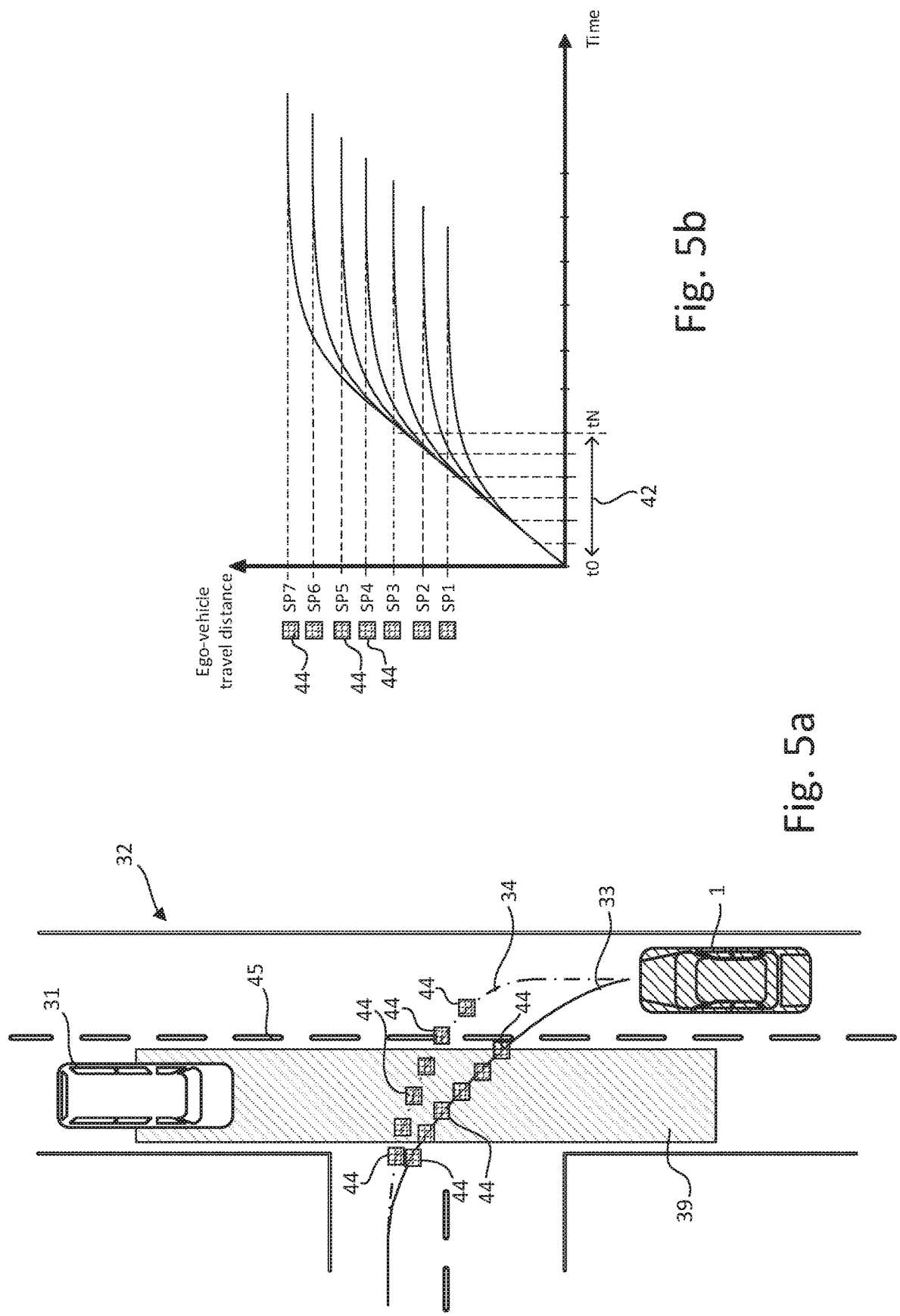

METHODS AND SYSTEMS FOR VEHICLE PATH PLANNING

CROSS-REFERENCE TO RELATED APPLICATIONS

This application is a 35 U.S.C § 371 national stage application for International Application No. PCT/US2020/022598, entitled "METHODS AND SYSTEMS FOR VEHICLE PATH PLANNING", filed on Mar. 13, 2020, the disclosures and contents of which are hereby incorporated by reference in their entireties.

TECHNICAL FIELD

The present disclosure relates to autonomous vehicles, and more specifically to path planning for autonomous vehicles.

BACKGROUND ART

During these last few years, the development of autonomous vehicles has exploded and many different solutions are being explored. Today, development is ongoing in both autonomous driving (AD) and advanced driver-assistance systems (ADAS), i.e. semi-autonomous driving, within a number of different technical areas within these fields. ADAS and AD may be generally referred to under the common term Automated Driving Systems (ADS) having different levels of automation as for example defined by the SAE J3016 levels of driving automation. One such area is how to move the vehicle with accuracy and consistency since this is an important safety aspect when the vehicle is moving within traffic.

In other words, development of autonomous driving vehicles is fast and there are regularly news and demonstrations of impressive technological progress. However, one of the largest challenges with ADS is to ensure that the self-driving vehicle is able to safely plan and execute paths and/or trajectories.

In general, conventional path planning system generates a target path for an autonomous vehicle from a given drivable area that is typically provided based on data from a perception system. The target path is assumed to be sent to a vehicle controller that computes steering angles and such that the vehicle follows the path.

SUMMARY

It is therefore an object of the present disclosure to provide a method for operating a vehicle having an ADS and a fallback stop feature, a computer-readable storage medium, a control device, and a vehicle comprising such a control device which alleviate all or at least some of the drawbacks of presently known systems.

More particularly, it is an object of the present disclosure to provide path planning or trajectory planning solution which not only focuses on avoidance of objects and comfort, but also reduces the risk of collision with other vehicles in case of unexpected stops of the ego-vehicle.

This object is achieved by means of a method for operating a vehicle having an ADS and a fallback stop feature, a computer-readable storage medium, a control device, and a vehicle comprising such a control device as defined in the appended claims. The term exemplary is in the present context to be understood as serving as an instance, example or illustration.

According to a first aspect of the present disclosure, there is provided a method for operating a vehicle having an ADS and a fallback stop feature. The method comprises obtaining sensor data and localization data comprising information about a surrounding environment of the vehicle, and determining a plurality of candidate paths for a prediction time horizon within a drivable area in the surrounding environment of the vehicle based on the sensor data and the localization data. Each candidate path is associated with a nominal cost functional value based on at least one cost parameter. Further, the method comprises determining an expected trajectory of a target vehicle located in the surrounding environment of the vehicle for the prediction time horizon based on the obtained sensor data and localization data, and determining, for each candidate path, an overlap cost parameter for an overlap between the target vehicle's expected trajectory and a set of stop positions of the vehicle based on predicted executions of the fallback stop feature within the prediction time horizon. The method further comprises selecting a candidate path from the plurality of candidate paths by computing a cost function based on the nominal cost functional value and the overlap cost parameter, and generating a control signal at an output so to control the vehicle to follow the selected candidate path.

Accordingly, there is provided a method for the ego vehicle to execute a path having a smallest duration of time with a portion of the ego vehicle in a lane with potential oncoming traffic (where stopping the vehicle unexpectedly could leave the ego vehicle passenger and oncoming vehicle passengers at risk of collision). Thereby, improving the overall safety for path planning and/or trajectory planning functions for autonomous vehicles.

According to a second aspect of the present disclosure, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, according to a third aspect of the present disclosure, there is provided a control device for operating a vehicle having an ADS and a fallback stop feature. The control device comprises control circuitry configured to obtain sensor data and localization data comprising information about a surrounding environment of the vehicle, determine a plurality of candidate paths for a prediction time horizon within a drivable area in the surrounding environment of the vehicle based on the sensor data and the localization data. Each candidate path is associated with a nominal cost functional value based on at least one cost parameter. Further, the control circuitry is configured to determine an expected trajectory of a target vehicle located in the surrounding environment of the vehicle for the prediction time horizon based on the obtained sensor data and localization data, and to determine, for each candidate path, an overlap cost parameter for an overlap between the target vehicle's expected trajectory and a set of stop positions of the vehicle based on predicted executions of the fallback stop feature within the prediction time horizon. The control circuitry is further configured to select a candidate path from the plurality of candidate paths by computing a cost function based on the nominal cost functional value and the overlap cost parameter, and generate a control signal at an output so to control the vehicle to follow the selected candidate path. With this aspect of the disclosure, similar advantages and preferred features are present as in the previously discussed first aspect of the disclosure.

In accordance with a fourth aspect of the present disclosure, there is provided a vehicle a perception system comprising at least one sensor configured to monitor a surrounding environment of the vehicle, a localization system configured to monitor a geographical map position of the vehicle, and a control device for operating a vehicle having an ADS and a fallback stop feature according to any one of the embodiments disclosed herein. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which:

FIG. 3a is a schematic top-view illustration of a vehicle with two candidate paths in accordance with an embodiment of the present disclosure.

FIG. 3b is a schematic graph illustrating a determination of a set of stop positions of the vehicle within a prediction time horizon in accordance with an embodiment of the disclosure.

FIG. 4a is a schematic top-view illustration of a vehicle and an accumulation of the set of stop positions for a first candidate path in accordance with an embodiment of the present disclosure.

FIG. 4b is a schematic top-view illustration of a vehicle and an accumulation of the set of stop positions for a second candidate path in accordance with an embodiment of the present disclosure.

FIG. 5a is a schematic top-view illustration of a vehicle with two candidate paths in accordance with an embodiment of the present disclosure.

FIG. 5b is a schematic graph illustrating a determination of a set of stop positions of the vehicle within a prediction time horizon in accordance with an embodiment of the disclosure.

DETAILED DESCRIPTION

Figure 1:
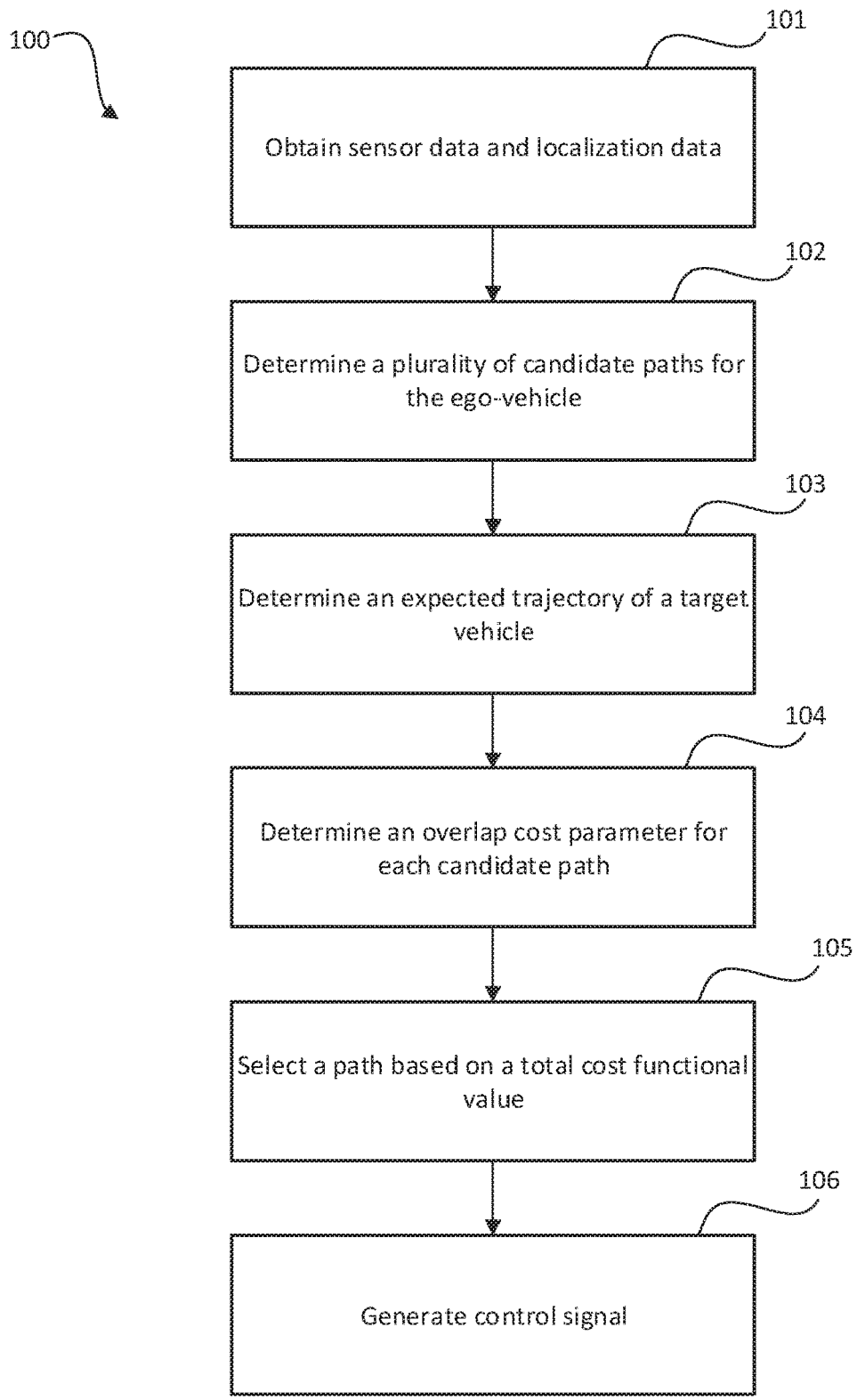
FIG. 1 is a schematic flow chart representation of a method for operating a vehicle having an Automated Driving System (ADS) and a fallback stop feature in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

In the present disclosure it is assumed that the Automated Driving System (ADS) requires user's/driver's supervision. Because of the assumption that the autonomous driving capability is not available at all times in every scenario, it is assumed that the ADS is available only in a limited Operational Design Domain (ODD), wherefore the user's/driver's ability to overtake the driving task is always assessed. When it is determined that the user does not have a readiness to overtake the driving for a certain period of time after a hand-over request has been issued (e.g. due to continuous inattentiveness), the ADS (or any related safety system) executes a fallback measure by decelerating vehicle and finally coming to a complete stop.

The fallback measure may also be performed when the autonomous driving system is no longer operational due to its failure and the driver does not overtake the control of the vehicle (upon request). It is furthermore assumed that the fallback system and vehicle control are available even if the rest of the ADS is not operational because of the safety design, which may be realized by hardware redundancy and "ASIL based" design. Moreover, for the sake of simplicity and conciseness of the present application the deceleration resulting from the fallback stop execution is herein approximated to have a predetermined profile such as a constant deceleration.

FIG. 1a shows a schematic flow chart representation of a method 100 for operating a vehicle having an Automated Driving System (ADS) and a fallback stop feature. The fallback stop feature may also be referred to as a "safe-stop"

feature. The ADS may for example be an ADS having an automation level 3 or higher as defined by SAE J3016 levels of automation.

The method 100 comprises obtaining 101 sensor data and localization data comprising information about a surrounding environment of the vehicle. The sensor data may for example be obtained from a perception system of the vehicle. A perception system is in the present context to be understood as a system responsible for acquiring raw sensor data from on-board sensors such as cameras, LIDARs and RADARs, ultrasonic sensors, and converting this raw data into scene understanding. Naturally, the sensor data may be received directly from one or more suitable sensors (such as e.g. cameras, LIDAR sensors, radars, ultrasonic sensors, etc.). The localization data preferably comprises a geographical position and a heading of the vehicle, as well as map data (e.g. HD-map data). In other words, the localization data is indicative of the vehicle's position and orientation on a map. The localization data may for example be obtained from a localization system of the vehicle. The localization system is a system configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. The term obtaining is herein to be interpreted broadly and encompasses receiving, retrieving, collecting, acquiring, and so forth.

Further, the method 100 comprises determining 102 a plurality of candidate paths for a prediction time horizon (may also be referred to as a planning horizon) within a drivable area in the surrounding environment of the vehicle based on the sensor data and the localization data. Moreover, each candidate path is associated with a nominal cost functional value based on at least one cost parameter.

In more detail, in some embodiments, based on HD map data and the vehicle's position, a sequence or set of waypoints are generated, where the waypoints serve the purpose of defining desirable points for the vehicle to pass through within a prediction/planning time horizon. Then, a drivable area is generated based on sensor data around these generated waypoints. Given the waypoints, the candidate paths are planned by evaluating a cost function that quantifies a set of criteria (e.g. path's closeness to waypoints, path smoothness, path total distance, etc.). Further, each path is preferably planned such that it is constrained within the generated drivable area. Moreover, in some embodiments a trajectory is planned wherefore longitudinal planning such as speed profile or longitudinal future goal position may be accounted for. Then, under the cost function and the constraints, a conventional optimization method can be utilized such as sample based methods (e.g. Rapidly-exploring Random Tree, RRT, RRT*) or optimal control methods (e.g. Model Predictive Control, MPC). Accordingly, the end product is a set of candidate trajectories with a nominal cost functional value.

Further, the method 100 comprises determining 103 an expected trajectory of a target vehicle (external vehicle) located in the surrounding environment of the vehicle for the prediction time horizon based on the obtained sensor data and localization data. Stated differently, a prediction 103 of an external vehicle's trajectory relative to the ego-vehicle is made based on sensor data and map data. In more detail, the step of determining 103 the expected trajectory may comprise determining a current state of the target vehicle based on sensor data and localization data, where the current state of the target vehicle comprises a geographical/map position of the target vehicle, a heading of the target vehicle, a speed of the target vehicle, a size of the target vehicle (e.g. width of the target vehicle), and predicting a future state of the vehicle based on the current state and localization data (e.g. lane geometry of the target vehicle's lane, obstacles, traffic rules, etc.). Then based on the current state and the predicted future state an expected trajectory may be determined.

For example, if the target vehicle is traveling in an adjacent lane of the ego-vehicle in an opposite direction relative to the ego-vehicle, then a prediction 103 is made of the target vehicle's trajectory within that lane given the target vehicle's initial state (e.g. position, heading, speed) and environmental parameters such as e.g. traffic rules, lane geometry (of the target vehicle's lane), obstacles, and so forth.

Given, the determined 103 expected trajectory, an overlap cost parameter is determined 104 for each determined 102 candidate path. The overlap cost parameter is indicative of an overlap between the target vehicle's expected trajectory and a set of stop positions of the ego-vehicle, where the set of stop positions are based on predicted executions of the fallback stop feature within the prediction time horizon. The set of stop positions may be understood as a "cumulative stop position" of the ego-vehicle given a plurality of executions at a number of points in time within the prediction time horizon. Here, the fallback stop feature is assumed to execute a stop within the generated path of the vehicle, i.e. we do not assume that there is a "safe zone" to which the ego-vehicle will move when executing a fallback stop feature. For example, if the prediction time horizon is 10 seconds, then the "set of stop positions" may be a prediction of the ego-vehicle's stop position when executing the fallback stop feature at 0 seconds, 2 seconds, 4 seconds, 6 seconds, 8 seconds, and 10 seconds. Accordingly, we have six stop positions of the ego-vehicle, within each candidate path, and these stop positions are then compared with the determined 103 expected trajectory of the target vehicle in order to compute the overlap cost parameter.

Further, the method 100 comprises selecting 105 a candidate path from the plurality of candidate paths by computing a cost function based on the nominal cost functional value and the overlap cost parameter, and generating 106 a control signal at an output so to control the vehicle to follow the selected candidate path. This may also be referred to as a constraint controlled technique with a cost-minimizing control strategy, i.e. given a set of constraints a number of candidate paths or trajectories are generated whereupon the candidate path with the least associated cost is selected.

As an effect, the ego-vehicle is configured to select the path or trajectory resulting in the smallest duration of time with a portion of the ego-vehicle in a lane with potential oncoming traffic (where stopping the vehicle unexpectedly could leave the ego vehicle passenger and oncoming vehicle passengers at risk of collision). Moreover, the present inventors realized that previous path planning solutions have focused on avoidance of objects, possible speed profiles, and/or efficiency of a selected trajectory, and therefore provided a new solution that supplements those concerns with an additional parameter. Namely, the risk associated with traversing area where it would be unsafe to stop the vehicle or to stop the vehicle unexpectedly from the perspective of an observer.

Accordingly, the herein proposed solution asserts that, at any given time, there is a non-zero risk that a fault could occur within the autonomous driving system. In some cases, the most desirable response to such a fault would be to bring the vehicle to an immediate stop in a safe manner. Given these conditions, it is desirable to minimize the amount of time that the autonomous system is in a state where stopping the vehicle immediately would be unsafe. Therefore, there is proposed a means of influencing the weighting factors (or cost function) of candidate paths (or trajectories) such that a penalty (or reward) is applied corresponding to the duration of time that the controlled vehicle is expected to be in such a condition (i.e. a state where stopping the vehicle immediately would be unsafe).

Executable instructions for performing these functions are, optionally, included in a non-transitory computer-readable storage medium or other computer program product configured for execution by one or more processors.

Figure 2:
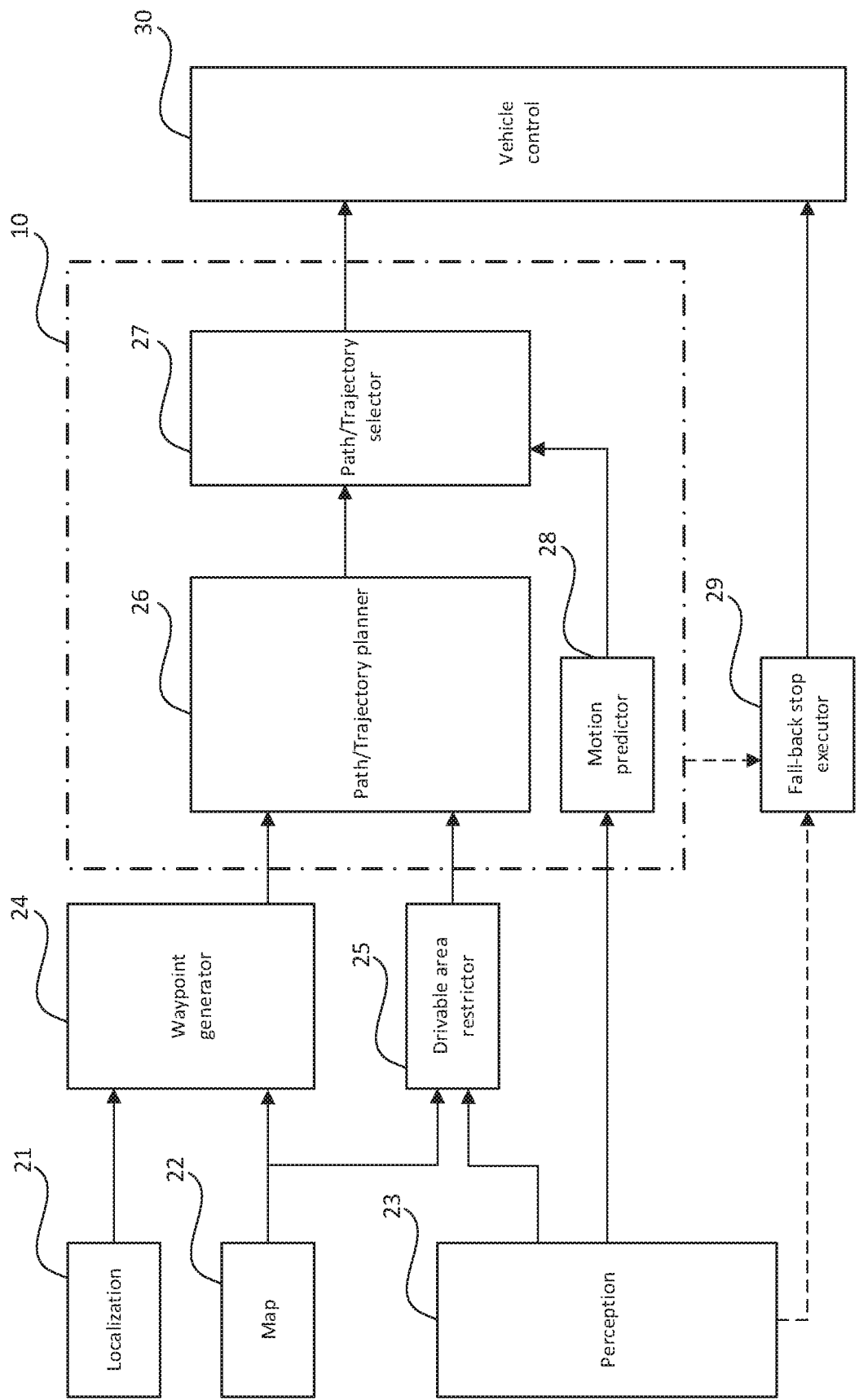
FIG. 2 is a schematic block diagram representation of a system for operating a vehicle having an Automated Driving System (ADS) and a fallback stop feature in accordance with an embodiment of the present disclosure.

FIG. 2 is a schematic block diagram depicting a system architecture including a control device 10 for operating a vehicle having an Automated Driving System (ADS) and a fallback stop feature. The ADS is illustrated in the form of a path/trajectory planner 26 (will be referred to as a path planner in the following), with additional modules in the form of a path/trajectory selector 27 (will be referred to as a path selector in the following), and a motion predictor 28. In other words, the herein disclosed methods may be realized as a software update of a conventional path/trajectory planning feature. Thus, the control device 10 comprises control circuitry (realized by means of a number of software/hardware modules 26, 27, 28).

Moving on the system architecture comprises a waypoint generator 24, which may be understood as a function configured to generate a sequence of waypoints that are desirable to pass through within a prediction/planning time horizon. The waypoint generator 24 receives input in the form of HD map data 22 and the ego-vehicle's position 21 in order to generate the waypoints. Further, based on HD map data 22 and sensor data 23, a "drivable area restrictor" generates the drivable area around the desired waypoints. In other words, it generates a "constriction" for the path planner 26.

The system further has a path planner 26, which is configured to determine a plurality of candidate paths for a prediction time horizon within a drivable area in the surrounding environment of the vehicle based on the sensor data 23 and the localization data 21, 22. In more detail, given the waypoints (generated by the waypoint generator 24), the path planner 26 determines a plurality of candidate paths by evaluating a cost function that quantifies a set of criteria, i.e. cost parameters, such as e.g. path closeness to waypoints, path smoothness, overall path distance, etc. Moreover, the plurality of candidate paths are determined such that they are constricted within the drivable area. In the case of trajectory planning, further criteria may be closeness to set speed, speed profile, and longitudinal future target position. Under the cost function, cost parameters, and constraints a numerical optimization method is used. Accordingly, the output from the path planner 26 is a set of candidate paths, where each candidate path is associated with a nominal cost functional value.

Further the motion predictor module 28 is configured to determine or predict a trajectory of a target vehicle located in the surrounding environment of the vehicle for the prediction time horizon based on sensor data 23 and localization data 21, 22. In more detail, the prediction may be carried out under a conservative assumption of the target vehicle's motion, for example by extending the speed vector of the target vehicle. Though the target vehicle may perform a gentle deceleration or a gradual evasive maneuverer, the assumption does not include its abrupt collision avoidance maneuverer with a large acceleration. Further, the path selector 27 is configured to select a candidate path from the plurality of candidate paths by computing a cost function based on the nominal cost functional value and the overlap cost parameter. In more detail, the path selector 27 is configured to select a candidate path such that it minimizes an overlapped region between the target vehicle's expected trajectory and a cumulative stop position of the ego-vehicle caused by fallback stop executions. Then, the path selector 27 is configured to generate a control signal at an output so to control the vehicle to follow the selected candidate path.

The generated control signal is received by a vehicle control system 30 configured to controls steering angle, acceleration, and braking such that the ego-vehicle follows the selected candidate path. Moreover, the vehicle control system 30 may be further configured to retain, in a memory, the most recently selected path/trajectory such that it is able to track the lateral target position during a fallback stop execution even when path planner is unable to provide a target path in case of a failure in the system. The system further has a fallback stop executor 29 which generates a command signal to the vehicle control system 29 in order to execute a fallback stop, i.e. a predetermined deceleration request. The fallback stop executor 29 may for example be configured to generate the command signal in case the driver/occupant is determined to be incapable of taking over a driving task for a certain period of time, or in case of a hardware/software failure in the ADS where the driver/occupant fails to respond to a handover request. In some embodiments the fallback stop executor is a part of the ADS software.

It should be noted that the illustrated modules of the system architecture in FIG. 2 is merely one example out of several possibilities covered by the scope of the present disclosure. For example, the path/trajectory planner 26 and the path/trajectory selector may be integrated into a single module. Thus, the combined module may obtain the nominal cost functional value and the overlap cost parameter and configured to directly select the optimal candidate path (i.e. the candidate path associated with the lowest total cost functional value).

Moreover, the motion predictor module 28 may be a separate module outside of the control device 10 such that the control device 10 is configured to "determine" a trajectory of a target vehicle located in the surrounding environment of the vehicle by obtaining the trajectory of the target vehicle from the "external" motion predictor module (not shown). Such, and other obvious modifications depending on the overall system architecture, specifications and intended application are considered to be readily understood by the skilled artisan and comprised in the scope of the present disclosure.

Various details and functions of the above disclosed method and system will be further elucidated with reference to an example scenario depicted in FIGS. 3a, 3b, 4a, 4b, 5a, and 5b, namely when the ego-vehicle is about to make a left-turn at an intersection, and thereby cross a lane with potential oncoming traffic.

FIG. 3a is a schematic top view illustration of an ego-vehicle 1 approaching an intersection 32 with the intention of making a left-turn and thereby cross a lane with oncoming traffic 31. The ego-vehicle 1 has an ADS, a fallback stop feature, and a control device (not shown) comprising control circuitry configured to execute one or more programs comprising instructions for performing the method according to any one of the embodiments disclosed herein. In more detail, the control circuitry is configured to obtain sensor data and localization data comprising information about a surrounding environment of the vehicle. As previously mentioned, the localization data may be in the form of HD-map data and a geographical position of the vehicle obtained by e.g. a Global Navigation Satellite System (GNSS) of the vehicle 1.

Further, the control circuitry is configured to determine a plurality of candidate paths 33, 34 for a prediction time horizon based on sensor data, map data and positional data. Each candidate path 33, 34 is provided with a nominal cost functional value computed based on one or more cost parameters. In the illustrated example (FIG. 3a), the first candidate path 33 results in a smaller nominal cost functional value than the second candidate path 34. Further, the control circuitry is configured to determine an expected trajectory 39 of one or more target vehicles 31 located in the surrounding environment 32 of the vehicle 1 for the prediction time horizon based on the sensor data and localization data. In more detail, in some embodiments, the prediction of the target vehicle's 31 expected trajectory 39 is carried out given some assumptions of the target vehicle's motion, e.g. by extending a speed vector of the target vehicle 31.

Still further, the control circuitry is configured to determine, for each candidate path 33, 34, an overlap cost parameter for an overlap between the target vehicle's 31 expected trajectory 39 and a set of stop positions of the ego-vehicle 1 based on predicted executions of the fallback stop feature within the prediction time horizon.

FIG. 3b is a schematic graph illustrating a determination of a set of stop positions, in the form of a "cumulative stop position" 41, of the vehicle 1 within a prediction time horizon 42 in accordance with an embodiment of the disclosure. The prediction time horizon 42 is here denoted as extending from a time t0 to time tN. In more detail, given prior knowledge of a fallback deceleration profile, current vehicle speed, and target speed profile in the future, the control circuitry may be configured to predict the stopping position of ego vehicle after the fallback is executed at any arbitrary point in time within the prediction time horizon [t0, tN]. Let t0 represent a present moment in time, the stop position resulting from the fallback initiated at t0 is predicted to be stop position SP1. Similarly, for tN that is the end of the prediction time horizon 42 from the present time, a second stop position SP2 resulting from the fallback initiated at tN is predicted. As mentioned, the prediction horizon 42 is a constant that may be predefined. Cumulative stop position of ego vehicle is accordingly defined as a range of stop positions expected from the fallback execution initiated between current time t0 to the time horizon t1.

The resulting overlap between the target vehicle's 31 expected trajectory and the set of stop positions, more specifically the cumulative stop positions, for each candidate path 33, 34 is illustrated in FIGS. 4a-4b. In more detail, FIGS. 4a-4b, are schematic top-view illustrations of an accumulation of the set of stop positions 41a for the first candidate path (FIG. 4a) and an accumulation of the set of stop positions 41b the second candidate path (FIG. 4b).

Furthermore, a first overlap 42a between the target vehicle's 31 expected trajectory 39 and the cumulative stop position 41a of the first candidate path is shown in FIG. 4a, while a second overlap 42b between the target vehicle's 31 expected trajectory 39 and the cumulative stop position 41b of the second candidate path is shown in FIG. 4b. As shown, the overlap is bigger for the first candidate path than for the second candidate path, i.e. the first overlap 42a is larger than the second overlap 42b (as indicated by the double-headed arrows 43a, 43b). Thus, the overlap cost parameter is accordingly larger for the first candidate path than for the second candidate path.

Moreover, the control circuitry is configured to also take into account the ego-vehicle's 1 dimensions for determining the plurality of candidate paths 33, 34, and in particular when determining the overlap parameter for each candidate path. Analogously, the control circuitry is configured to take into account the target vehicle's 31 dimensions/size when determining the target vehicle's expected trajectory 39. In other words, the ego-vehicle's 1 dimensions (or at least the length of the ego-vehicle 1) as well as the target vehicle's dimensions (or at least the width of the target vehicle 39) are used to determine the overlap cost parameter. By accounting for at least the width of the target vehicle 39 and the length of the ego-vehicle 1 a more accurate estimation of the overlap 42a, 42b between the target vehicle's 31 expected trajectory 39 and the ego-vehicle's 1 candidate paths is achievable.

Alternatively one may construe that the expected trajectory 39 of the target vehicle 31 may further comprise a width defined by the width of the target vehicle 31. Similarly, each candidate path may comprise a width defined by the width of the ego-vehicle 1.

Thus, the control circuitry of the control device is configured to select a candidate path from the plurality of candidate paths (ref. 33, 34 in FIG. 3a) by computing a cost function based on the nominal cost functional value and the overlap cost parameter associated with each candidate path. Stated differently, when selecting the candidate path, the control circuitry is configured to select a candidate path from the plurality of candidate paths that has a minimum overlap region 42a, 42b between the target vehicle's 31 expected trajectory 39 and the set of stop positions 41a, 41b of the vehicle 1 as a result of predicted executions of the fallback stop feature within the prediction time horizon. Accordingly, in the illustrated examples in FIGS. 3a-3b and 4a-4b, the nominal cost of the first candidate path 33 is smaller than the nominal cost of the second candidate path 34. However, total cost functional value (i.e. the nominal cost+the overlap cost parameter) is smaller for the second candidate path 34 than for the first candidate path 33. Thus, the control circuitry is configured to select the second candidate path 33, and to generate a control signal at an output so to control the vehicle to follow the selected candidate path (i.e. second candidate path 34).

FIG. 5a is a schematic top-view illustration of an ego-vehicle 1 with two candidate paths 33, 34 in accordance with another embodiment of the present disclosure. In more detail, FIG. 5a serves to illustrate another example of how to determine the overlap cost parameter for an overlap between the target vehicle's 31 expected trajectory 39 and a set of stop positions of the ego-vehicle 1 based on predicted executions of the fall-back stop feature within the prediction time horizon. The same two example candidate paths 33, 34 are used as discussed in the previous examples with ref to FIGS. 3a-3b, and 4a-4b.

FIG. 5b is a schematic graph illustrating a determination of a set of stop positions 44 of the ego-vehicle 1 within a prediction time horizon 42 [t0, tN] in accordance with an embodiment of the disclosure. In more detail, given prior knowledge of a fallback deceleration profile, current vehicle speed, and target speed profile in the future, the control circuitry may be configured to predict the stopping position of ego vehicle after the fallback is executed at a number of points in time within the prediction time horizon 42, here seven equidistantly points in time are selected. Let t0 represent a present moment time, the stop position resulting from the fallback initiated at t0 is predicted to be a first stop position SP1. Similarly, for a second moment in time t1, a second stop position SP2 resulting from a fallback initiated at t2 is predicted, and so forth until a seventh stop position SP7 is determined as a result from a fallback initiated at tN.

A graphical representation of the set of stop positions 44 are indicated for each candidate path 33, 34 in FIG. 5a. Thus, for determining the overlap cost parameter, one can compute how many of the stop positions 44 for each candidate path 33, 34 are overlapping with the expected trajectory 44 of the target vehicle 31. For the first candidate path 33, there are four fully overlapping stop positions 44 and 1 partly overlapping stop position 44, while for the second candidate path 34 there are three fully overlapping stop positions 44. Thus, as a result the overlap cost parameter associated with the first candidate path 33 is larger than the overlap cost parameter for the second candidate path 34. As mentioned in the foregoing, the width of the target vehicle 31, may be accounted for when determining the expected trajectory 39 of the target vehicle 31. In other words, the expected trajectory 39 of the target vehicle 31 may have a width defined by the width of the target vehicle 31. Moreover, the length of the ego-vehicle may be used to compute if a stop position 44 renders in an overlap with the expected trajectory 39 of the target vehicle 31. For example, if the ego-vehicle's 1 reference point is a center point of the rear axle then stop positions close to the first border of the expected trajectory 39 (i.e. stop positions close to the center lane marker) may still result in an overlap, in contrast to the the stop positions close to the opposite border of the expected trajectory 39 may be "clear" (i.e. non-overlapping).

Furthermore, while the above example embodiments have been made in reference to a scenario concerning an intersection, and more specifically a left-turn at an intersection, there are additional scenarios where planned candidate paths of the ego-vehicle intersect an expected trajectory of a target vehicle. For example, such situations may occur when the ego-vehicle merges to a second lane of a main road from an alley while a target vehicle is approaching in a first lane of the main road. Another example scenario is when the ego-vehicle is followed by a target vehicle on a road having multiple lanes for traffic traveling in the same direction.

In reference to the latter example scenario, based on the same principles of candidate path selection as discussed in the foregoing, the ego-vehicle may select a candidate path resulting in a switch of lanes due to the target vehicle approaching from behind. The lane change would then result in a reduced risk of collision if the ego-vehicle would stop unexpectedly (i.e. if a fallback stop would be executed).

However, in some embodiments, the control circuitry is further configured to determine a scenario from a plurality of predefined scenarios (e.g. approaching intersection, traveling on a multi-lane carriageway, lane merging, etc.) based on sensor data and localization data. In some embodiments, a machine learning model or a predefined function configured to determine a current scenario based on sensor data and localization data may be utilized. For example, given a position of the vehicle, and HD-map data, one can determine if the ego-vehicle is at an "intersection scenario" or a "lane merging scenario" whereby the overlap cost parameter may be weighed differently depending on the current scenario. Accordingly, the overlap cost parameter, for each candidate path, may be further based on the determined scenario. In other words, depending on a current scenario of the vehicle, the overlap cost parameter may be weighted differently when computing the total cost functional value for each candidate path. This may be advantageous in order to avoid unnecessary lane changes in various scenarios, and thereby improve passenger comfort.

Similarly, the overlap cost parameter may be weighed differently depending on a traffic density, which is another "scenario parameter" used to define a current scenario of the vehicle. In more detail, the cost parameter may have more impact on the total cost functional value in a scenario having a high traffic density as compared to a scenario with low traffic density. Analogously, path smoothness, which is used to define the nominal cost functional value, may be weighed differently depending on road surface conditions (another scenario parameter), such that at slippery conditions (e.g. ice on the road surface), the path smoothness has a higher impact on the nominal cost functional value in order to avoid lateral sliding of the ego-vehicle as compared to non-slippery conditions (e.g. dry road surface).

Figure 6:
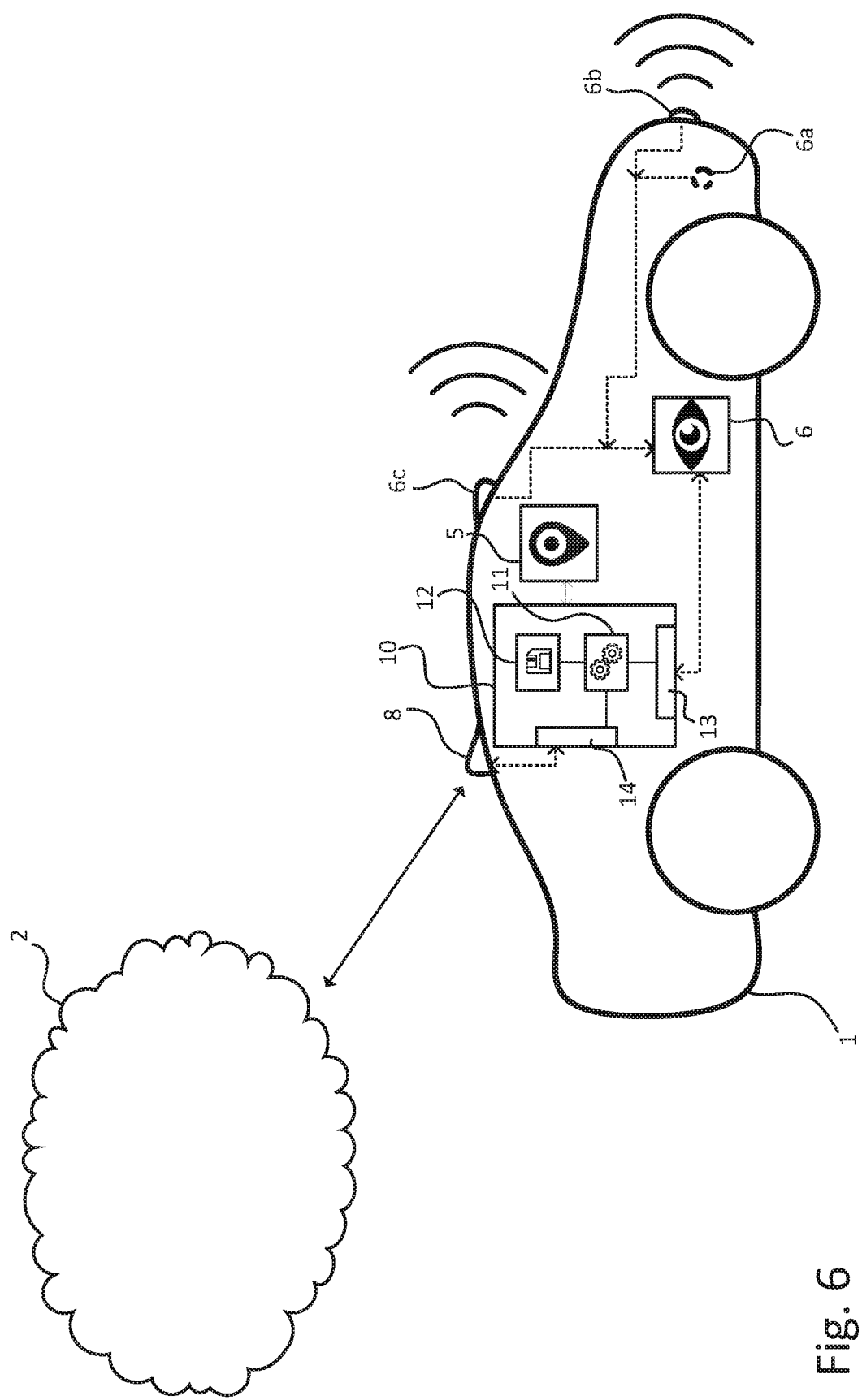
FIG. 6 is a schematic side-view of a vehicle in accordance with an embodiment of the present disclosure.

Moving on, FIG. 6 is a schematic side-view illustration of a vehicle 1 comprising a control device 10 for operating the vehicle 1 in accordance with an embodiment of the present disclosure. The vehicle 1 further comprises a perception system 6 and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, the localization system may further comprise map data (or configured to obtain map data from an associated memory) in the form of HD-map data.

The control device 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for controlling a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

Further, the vehicle 1 may be connected to external network(s) 2 via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as Wi-Fi, LoRa, Zigbee, Bluetooth, or similar mid/short range technologies.

Accordingly, it should be understood that parts of the described solution may be implemented either in the vehicle 1, in a system located external the vehicle 1, or in a combination of internal and external the vehicle 1; for instance in a server in communication with the vehicle 1, a so called cloud solution. For instance, sensor data may be sent to an external system and that system performs the some or all of the necessary steps to select the optimal candidate path. The different modules and steps of the embodiments may be combined in other combinations than those described.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for operating a vehicle having an Automated Driving System (ADS) and a fallback stop feature, the method comprising:
    obtaining sensor data and localization data comprising information about a surrounding environment of the vehicle;
    determining a plurality of candidate paths for a prediction time horizon within a drivable area in the surrounding environment of the vehicle based on the obtained sensor data and the localization data, each candidate path being associated with a nominal cost functional value based on at least one cost parameter;
    determining an expected trajectory of a target vehicle located in the surrounding environment of the vehicle for the prediction time horizon based on the obtained sensor data and localization data;
    determining, for each candidate path, an overlap cost parameter for an overlap between the target vehicle's expected trajectory and a set of stop positions of the vehicle based on predicted executions of the fallback stop feature within the prediction time horizon;
    selecting a candidate path from the plurality of candidate paths by computing a cost function based on the nominal cost functional value and the overlap cost parameter; and
    generating a control signal at an output so to control the vehicle to follow the selected candidate path.

2. The method according to claim 1, wherein the predicted executions of the fallback stop feature comprise predicted executions of the fallback stop feature within each candidate path.

3. The method according to claim 1, wherein the set of stop positions comprise at least two stop positions based on predicted executions of the fallback stop feature within the prediction time horizon.

4. The method according to claim 1, wherein the at least one cost parameter is based on at least one of a closeness to waypoints, path distance, and path smoothness.

5. The method according to claim 1, wherein the step of selecting the candidate path from the plurality of paths comprises:
  determining a total cost functional value for each candidate path based on the nominal cost functional value and the overlap cost parameter; and
  selecting the candidate path associated with the lowest total cost functional value.

6. The method according to claim 1, further comprising:
  determining a scenario from a plurality of predefined scenarios based on the obtained sensor data and localization data; and
  wherein determining, for each candidate path, the overlap cost parameter is further based on the determined scenario.

7. A non-transitory computer-readable storage medium storing computer-executable instructions which, when executed by one or more processors of a vehicle control system, causes one or more processors of the vehicle control system to carry out the method according to claim 1.

8. A control device for operating a vehicle having an Automated Driving System (ADS) and a fallback stop feature, the control device comprising control circuitry configured to:
  obtain sensor data and localization data comprising information about a surrounding environment of the vehicle;
  determine a plurality of candidate paths for a prediction time horizon within a drivable area in the surrounding environment of the vehicle based on the obtained sensor data and the localization data, each candidate path being associated with a nominal cost functional value based on at least one cost parameter;
  determine an expected trajectory of a target vehicle located in the surrounding environment of the vehicle for the prediction time horizon based on the obtained sensor data and localization data;
  determine, for each candidate path, an overlap cost parameter for an overlap between the target vehicle's expected trajectory and a set of stop positions of the vehicle based on predicted executions of the fallback stop feature within the prediction time horizon;
  select a candidate path from the plurality of candidate paths by computing a cost function based on the nominal cost functional value and the overlap cost parameter; and
  generate a control signal at an output so to control the vehicle to follow the selected candidate path.

9. The control device according to claim 8, wherein the predicted executions of the fallback stop feature comprise predicted executions of the fallback stop feature within each candidate path.

10. The control device according to claim 8, wherein the set of cumulative stop positions comprise at least two stop positions based on predicted executions of the fallback stop feature within the prediction time horizon.

11. The control device according to claim 8, wherein the at least one cost parameter is based on at least one of a closeness to waypoints, path distance, and path smoothness.

12. The control device according to claim 8, wherein the control circuitry is configured to select the candidate path from the plurality of paths by:
  determining a total cost functional value for each candidate path based on the nominal cost functional value and the overlap cost parameter; and
  selecting the candidate path associated with the lowest total cost functional value.

13. The control device according to claim 8, wherein the control circuitry is further configured to:
  determine a scenario from a plurality of predefined scenarios based on the obtained sensor data and localization data; and
  wherein the overlap cost parameter, for each candidate path, is determined further based on the determined scenario.

14. A vehicle comprising:
  a perception system comprising at least one sensor configured to monitor a surrounding environment of the vehicle;
  a localization system configured to monitor a geographical map position of the vehicle; and
  a control device for operating a vehicle having an Automated Driving System (ADS) and a fallback stop feature, the control device comprising control circuitry configured to:
    obtain sensor data and localization data comprising information about a surrounding environment of the vehicle;
    determine a plurality of candidate paths for a prediction time horizon within a drivable area in the surrounding environment of the vehicle based on the obtained sensor data and the localization data, each candidate path being associated with a nominal cost functional value based on at least one cost parameter;
    determine an expected trajectory of a target vehicle located in the surrounding environment of the vehicle for the prediction time horizon based on the obtained sensor data and localization data;
    determine, for each candidate path, an overlap cost parameter for an overlap between the target vehicle's expected trajectory and a set of stop positions of the vehicle based on predicted executions of the fallback stop feature within the prediction time horizon;
    select a candidate path from the plurality of candidate paths by computing a cost function based on the nominal cost functional value and the overlap cost parameter; and
    generate a control signal at an output so to control the vehicle to follow the selected candidate path.

* * * * *